US008505305B2

(12) United States Patent
Ziaei et al.

(10) Patent No.: US 8,505,305 B2
(45) Date of Patent: Aug. 13, 2013

(54) DIFFUSER WITH IMPROVED EROSION RESISTANCE

(75) Inventors: Reza Ziaei, Thornhill (CA); Victor Salivon, Toronto (CA); Jaroslaw Wójcik, Longueuil (CA)

(73) Assignee: Pratt & Whitney Canada Corp., Longueuil, Quebec ( * ) Notice: Subject to any disclaimer, the term of this patent is extended or adjusted under 35 U.S.C. 154(b) by 1405 days.

(21) Appl. No.: 11/737,794

(22) Filed: Apr. 20, 2007

(65) Prior Publication Data

US 2008/0256926 A1 Oct. 23, 2008

(51) Int. Cl.
*F02C 1/00* (2006.01)

(52) U.S. Cl.
USPC .......... 60/751

(58) Field of Classification Search
USPC .......... 60/751, 752; 29/889.2
See application file for complete search history.

(56) References Cited

U.S. PATENT DOCUMENTS 3,622,402 A * 11/1971 Baranow et al. .......... 428/667
3,765,792 A 10/1973 Exley
3,935,034 A 1/1976 Hayes
4,402,764 A 9/1983 Clark et al.
4,576,550 A 3/1986 Bryans
4,740,138 A * 4/1988 Zaehring et al. .......... 415/12
4,832,993 A 5/1989 Coulon
4,919,773 A 4/1990 Naik
5,064,691 A 11/1991 Kirner et al.
5,116,197 A * 5/1992 Snell .......... 415/126
5,759,688 A * 6/1998 Lee et al. .......... 428/408
5,876,572 A 3/1999 Rickerby et al.
6,060,174 A * 5/2000 Sabol et al. .......... 428/610
6,209,312 B1 4/2001 Singer et al.
6,478,887 B1 11/2002 Sue et al.
6,605,160 B2 8/2003 Hoskin
6,706,319 B2 3/2004 Seth et al.
6,797,335 B1 9/2004 Paderov et al.
6,968,697 B2 * 11/2005 Nguyen et al. .......... 60/772
7,510,742 B2 * 3/2009 Kmetz .......... 427/255.15
2002/0036030 A1 * 3/2002 Baudis et al. .......... 148/279

FOREIGN PATENT DOCUMENTS

DE 41 39 956 6/1993
DE 4139956 A1 6/1993
DE 44 43 914 6/1996
WO 00/06911 A1 2/2000

OTHER PUBLICATIONS

Kawagishi, W. et al. Protective Design and Boride Coating against Solid Particle Erosion of First-Stage Turbine Nozzles,PWR, ASME Power Division, 1990 vol. 10, pp. 23-29, US.
Urm, K.W. et al The Effect of Surface Treatments on Solid Particle Erosion of 12CR Steels for USC Power Plants,Diffusion and Defect Data Pt. B:Solid State Phenomena,2006,Vol.
European Search Report dated Feb. 22, 2012 of corresponding EP application No. 08 25 1460.

* cited by examiner

*Primary Examiner* — Phutthiwat Wongwian
(74) *Attorney, Agent, or Firm* — Norton Rose Fulbright Canada LLP

(57) ABSTRACT

A diffuser for a centrifugal compressor in a gas turbine engine, the diffuser including a diffuser ring having a series of bores defined therethrough to receive and direct air exiting the compressor, each bore being defined by a respective bore surface including a boride layer protecting the bore surface from erosion damage.

7 Claims, 3 Drawing Sheets

DIFFUSER WITH IMPROVED EROSION RESISTANCE

TECHNICAL FIELD

The invention relates generally to gas turbine engines and, more particularly, to an improved diffuser for centrifugal compressors of such engines.

BACKGROUND OF THE ART

Centrifugal compressors in gas turbine engines generally include a diffuser located radially outwardly of a centrifugal impeller such as to receive the airflow coining therefrom. In applications where the gas turbine engine ingests hard particles such as sand with aluminium oxide and silicon oxide content, for example in helicopter turboshaft engines that ingest significant amounts of sand and dust during take-off and close-to-ground flights, such hard particles are usually mixed in the compressor air and can travel at an ultrasound velocity when entering the diffuser. These high speed abrasive particles can cause erosion of bores defined through the diffuser and directing the airflow, thus increasing the diameter of these bores, which usually causes a loss of compressor efficiency and of surge margin and can even cause surging if the surge margin is exceeded.

However, diffuser bore surfaces are relatively hard of access and generally define sharp edges, and as such are difficult to treat to improve their erosion resistance.

Accordingly, improvements are desirable.

SUMMARY OF THE INVENTION

It is therefore an object of this invention to provide an improved diffuser for a centrifugal compressor in a gas turbine engine.

In one aspect, the present invention provides a diffuser for a centrifugal compressor in a gas turbine engine, the diffuser comprising a diffuser ring for surrounding a periphery of the compressor, the diffuser ring defining an inner surface adapted to extend adjacent the periphery of the compressor and an opposed outer surface, the diffuser ring including a series of bores defined therethrough from the inner surface to the outer surface to receive and direct air exiting the compressor, each bore being defined by a respective bore surface, and each bore surface including a boride layer protecting the bore surface from erosion damage.

In another aspect, the present invention provides a compressor section for a gas turbine engine, the compressor section comprising a centrifugal impeller assembly and means for slowing and pressurizing an air flow exiting the impeller assembly, the means defining a plurality of surfaces in contact with the air flow, at least a portion of the surfaces including a boride surface layer protecting the surface from erosion damage.

In a further aspect, the present invention provides a method of manufacturing a gas turbine component having at least one gas path-defining surface, the method comprising boronizing the at least one gas-path defining surface to provide protection from erosion damage.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
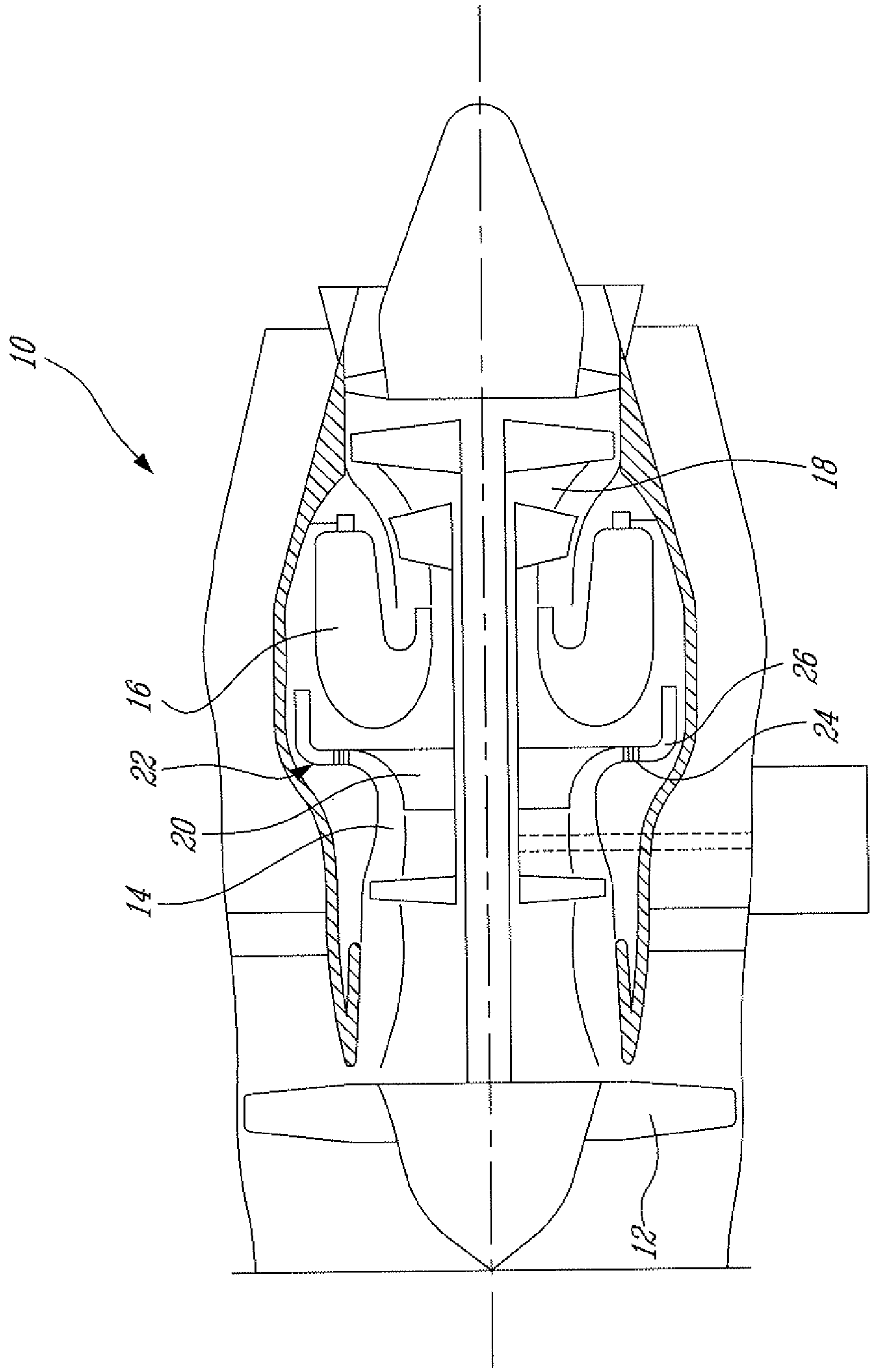
FIG. 1 is a schematic cross-sectional side view of a gas turbine engine in which the present invention can be used.

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The compressor section 14 includes at least one centrifugal impeller assembly 20 and a corresponding diffuser 22, and the air compressed by the impeller assembly 20 goes through the diffuser 22 before entering the combustor 16. The diffuser 22 extends radially outwardly of the impeller assembly 20 and generally comprises a diffuser ring 24 surrounding the impeller assembly 20 and receiving high velocity airflow therefrom, and a series of diffuser pipes 26 in communication with the diffuser ring 24 and directing the air flow toward the combustor 16. The diffuser 22 converts the high velocity air flow into a high pressure air flow, i.e. slows and pressurizes the air flow coming out of the impeller assembly 20.

Figure 2:
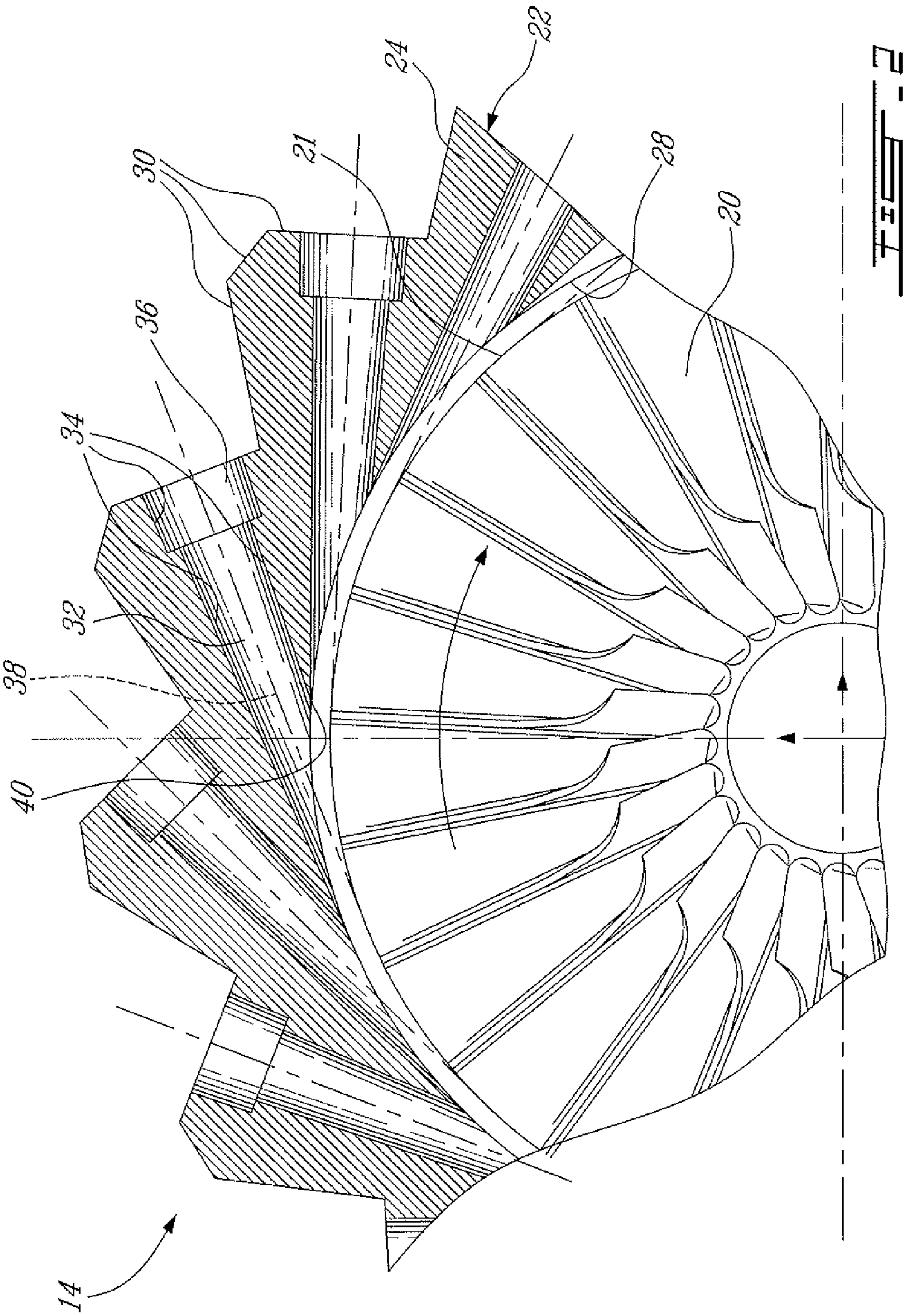
FIG. 2 is a cross-sectional front view of a part of a compressor section of the gas turbine engine of FIG. 1.

Referring to FIG. 2, the diffuser ring 24 includes an inner surface 28 extending adjacent a periphery 21 of the impeller assembly 20, and an opposed outer surface 30. A series of angled bores 32 are defined through the diffuser ring 24 from the inner surface 28 to the outer surface 30, each bore 32 being defined by a corresponding bore surface 34. The bores 32 receive and direct the air flow exiting the impeller assembly 20 toward the diffuser pipes 26 (see FIG. 1), and as such the bore surfaces 34 are exposed to any foreign particles transported by that air flow. In a particular embodiment, the diffuser ring 24 is made of stainless steel 410 (SST 410), although other adequate materials can alternately be used.

In the embodiment shown, each bore 32 is tangential, i.e. it is oriented such that its central axis 38 coincides with a tangent to the periphery 21 of the impeller assembly 20, and includes an enlarged outlet 36 for connection with a respective one of the diffuser pipes 26. The bores 32 are defined as close as possible to one another, such that the bore surfaces 34 of adjacent bores 32 intersect and define a sharp edge 40 in the inner surface 28. It is understood that other diffuser ring configurations are alternately possible.

Figure 3:
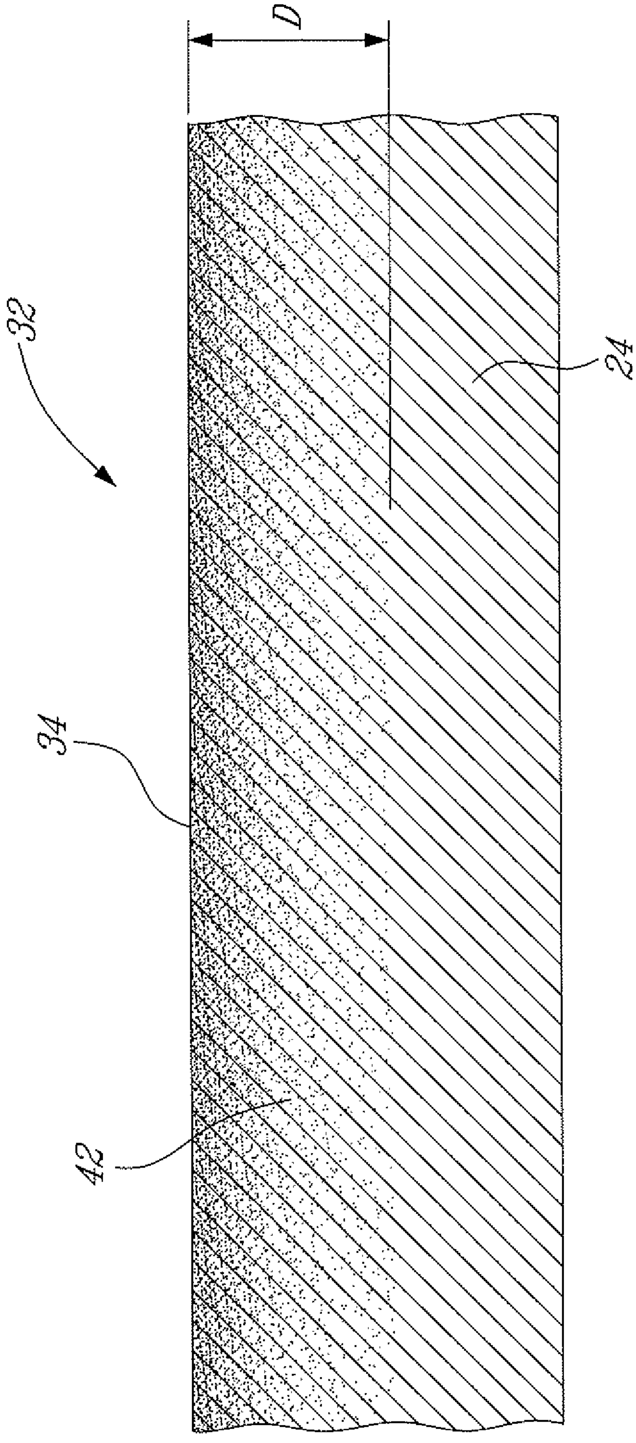
FIG. 3 is a schematic cross-section of a portion of a diffuser ring of the compressor section of FIG. 2, in accordance with a particular aspect of the present invention.

Referring to FIG. 3, the bore surface 34 of each bore 32 includes a boride layer 42 acting to protect the bore surface 34 from erosion damage resulting to exposure to dry abrasive particles transported by the air flow. In a particular embodiment, the boride layer 42 has a depth of penetration of 0.001 to 0.0012 inch (25-30 μm) and provides a surface hardness of 75 to 80 HRC (1200-1600 HV100), as opposed to a hardness of between 28 and 33 HRC usually provided by an untreated SST 410 surface. This increased surface hardness provided by the boride layer 42 thus for the increased dry erosion resistance of the bore surfaces 34.

The boride layer 42 preferably has a uniform distribution of borides diminishing gradually from the surface to the core as shown in FIG. 3, where the borides are schematically represented by small dots. The boride layer 42 is also preferably composed of a single phase such as to provide for maximal dry erosion resistance.

It should be noted that the boride layer 42 is not necessarily a completely distinguishable layer from the substrate material, i.e. the term "boride layer" is used to describe the presence of borides included in a surface portion of the substrate material in sufficient quantity to improve its erosion resistance properties.

In a particular embodiment, the boride layer 42 is formed in accordance with the following.

The bore surfaces 34 are cleaned such as to be free of dirt, grease and oil, and the surfaces of the diffuser ring 24 which do not require boronizing (for example the inner and outer surfaces 28, 30) are masked in a suitable manner. The surfaces to be boronized are surrounded with boronizing agent to a depth of preferably no less than 0.25 inch (6.35 mm). Most preferably, the bores 32 are completely filled with the boronizing agent. The diffuser ring 24 is then heated to between 1500° F. and 1800° F. under a suitable protective atmosphere for a predetermined period of time, depending on the desired depth of penetration of the boride layer 42, during which boron atoms from the boronizing agent diffuse into the metal substrate and form metal borides. The relation between the parameters (e.g. time, temperature) of the heating phase and the depth of penetration of the resulting boride layer 42 depends on the properties of the substrate material and can be determined through experimentation. For example, it has been found that for the above described diffuser ring 24, and wherein the material to be boronized is stainless steel 410 (SST 410), a desired depth of about 0.001 to 0.002 inches for the boride layer 42 can be achieved by heating the ring 24 at a temperature of about 1650° F. for a period of about 360 minutes.

The borides are preferably deposited in one stage such as to obtain the single phase boride layer 42.

In a particular embodiment, the boronizing agent used is a powder preferably containing about 50% by weight of a mix of a boron fluoride (e.g. boron trifluoride) and silicon carbide, and about 50% by weight of aluminium oxide, thoroughly blended with one another. This boronizing agent is particularly adapted to produce a boride layer 42 with iron base or nickel base substrate materials, and advantageously allows for the production of a boride layer 42 devoid of surface cracks also known as the "elephant skin" surface effect, which is a common surface pattern found in boronized iron base steels. The elimination of the surface cracks advantageously improves the appearance of the treated surface as well as its resistance to dry erosion. This boronizing agent is also adapted to produce a boride layer 42 resistant to subsequent heat treatments.

Alternate boronizing agents that can be used include, for example, Ekabor™ EB-2 supplied by BorTec GmbH, although the use of this boronizing agent can lead to the creation of the less desirable surface cracks depending on the substrate material being boronized.

Subsequent high temperature operations of the boronized diffuser ring 24, for example brazing on or near the boronized bore surfaces 34, are preferably limited to a temperature of less than 1000° C. in order to protect the boride layer 42.

The formation of the boride layer 42 advantageously allows for keeping the original surface finish of the bore surfaces 34. For example, in a particular embodiment, the surface finish of the bore surfaces 34 before and after the creation of the boride layer 42 is 32 AA.

The above description is meant to be exemplary only, and one skilled in the art will recognize that changes may be made to the embodiments described without department from the scope of the invention disclosed. For example, other internal or female surfaces of gas turbine engines subjected to dry erosion or similar wear, such as any gas path-defining surface, and particularly any static gas path-defining surface, could be similarly provided with a boride layer. Still other modifications which fall within the scope of the present invention will be apparent to those skilled in the art, in light of a review of this disclosure, and such modifications are intended to fall within the appended claims.

What is claimed is:

1. A diffuser for a centrifugal compressor in a gas turbine engine, the diffuser comprising a diffuser ring for surrounding a periphery of the compressor, the diffuser ring being made from one of iron based and nickel based metal and defining an inner surface adapted to extend adjacent the periphery of the compressor and an opposed outer surface, the diffuser ring including a series of bores defined therethrough from the inner surface to the outer surface to receive and direct air exiting the compressor, each bore being defined by a respective erosion resistant surface consisting of a surface boride layer formed of borides of the diffuser ring metal obtained through reaction of the diffuser ring metal with a boronizing agent including about 50% by weight of a mix of boron fluoride and silicon carbide.

2. The diffuser as defined in claim 1, wherein the boride layer has a depth of 0.001 inch to 0.0012 inch.

3. The diffuser as defined in claim 1, wherein the boride layer has a uniform distribution of borides diminishing gradually from a surface to a core of the layer.

4. The diffuser as defined in claim 1, wherein the boride layer is devoid of surface cracks.

5. The diffuser as defined in claim 1, wherein the boride layer has a surface hardness of 1200 to 1600 HV.

6. The diffuser as defined in claim 1, wherein the boride layer is composed of a single phase.

7. The diffuser as defined in claim 1, wherein the diffuser ring is made of stainless steel.

* * * * *